US012346040B2

(12) United States Patent
Yoshioku et al.

(10) Patent No.: US 12,346,040 B2
(45) Date of Patent: Jul. 1, 2025

(54) IMAGE FORMING APPARATUS

(71) Applicant: KYOCERA Document Solutions Inc., Osaka (JP)

(72) Inventors: Shinobu Yoshioku, Osaka (JP); Keiko Morita, Osaka (JP); Tetsuya Maeda, Osaka (JP); Ryota Maeda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/628,276

(22) Filed: Apr. 5, 2024

(65) Prior Publication Data

US 2024/0345505 A1 Oct. 17, 2024

(30) Foreign Application Priority Data

Apr. 14, 2023 (JP) ................................ 2023-066037

(51) Int. Cl.
*G03G 15/08* (2006.01)
*G03G 15/00* (2006.01)

(52) U.S. Cl.
CPC ..... *G03G 15/0856* (2013.01); *G03G 15/0867* (2013.01); *G03G 15/5016* (2013.01)

(58) Field of Classification Search
CPC ........... G03G 15/0856; G03G 15/0867; G03G 15/5016
USPC ................. 399/107, 110, 119, 120, 252, 258
See application file for complete search history.

(56) References Cited

U.S. PATENT DOCUMENTS 7,242,879 B2 * 7/2007 Kakuno ............. G03G 15/5079 399/227
8,538,281 B2 * 9/2013 Takuwa ................. G03G 21/12 399/27
9,280,116 B2 * 3/2016 Okada ................ G03G 15/0877

FOREIGN PATENT DOCUMENTS

JP 2014157350 A 8/2014

* cited by examiner

*Primary Examiner* — Hoan H Tran
(74) *Attorney, Agent, or Firm* — Alleman Hall & Tuttle LLP

(57) ABSTRACT

A target selection portion selects one target attachment portion out of a plurality of attachment portions, and selects, when a detection state regarding a target storage unit attached to the target attachment portion out of a plurality of developer storage units changes from a developer-remaining state to a developer-empty state, a new target attachment portion as the target attachment portion. A notification processing portion executes, when a first notification mode is selected, empty state notification processing for outputting information representing the developer-empty state to a notification destination every time the developer-empty state of the target storage unit is detected. The notification processing portion executes, when a second notification mode is selected, the empty state notification processing when the developer-empty states of some of the plurality of developer storage units are detected.

5 Claims, 9 Drawing Sheets

IMAGE FORMING APPARATUS

INCORPORATION BY REFERENCE

This application is based upon and claims the benefit of priority from the corresponding Japanese Patent Application No. 2023-066037 filed on Apr. 14, 2023, the entire contents of which are incorporated herein by reference.

BACKGROUND

The present disclosure relates to an image forming apparatus to which a plurality of developer storage units that store developer of the same color can be attached.

An image forming apparatus includes one or more attachment portions to which developer storage units that store developer are to be attached. For example, when capable of executing color print processing, the image forming apparatus includes a plurality of attachment portions corresponding to a plurality of development colors.

Further, as the image forming apparatus, there is known an image forming apparatus to which two toner containers can be attached for each of toner in four colors of yellow, magenta, cyan, and black. It is noted that the toner is an example of the developer. The toner container is an example of the developer storage unit.

When the image forming apparatus includes two attachment portions for each of the development colors, a downtime during which print processing cannot be executed is not caused even during replacement of the developer storage unit.

SUMMARY

An image forming apparatus according to one aspect of the present disclosure includes a printing portion, a plurality of attachment portions, a remaining amount detection portion, a target selection portion, a supplying mechanism, a notification mode selection portion, and a notification processing portion. The printing portion forms an image on a sheet. A plurality of developer storage units can be attached to each of the plurality of attachment portions, the plurality of developer storage units storing developer of a same color that is to be supplied to the printing portion. The remaining amount detection portion detects a remaining amount of the developer in each of the plurality of developer storage units attached to the plurality of attachment portions. The target selection portion selects one target attachment portion out of the plurality of attachment portions, and selects, when a detection state of the remaining amount detection portion regarding a target storage unit attached to the target attachment portion out of the plurality of developer storage units changes from a developer-remaining state to a developer-empty state, a new target attachment portion as the target attachment portion. The supplying mechanism supplies the developer from the target storage unit to the printing portion. The notification mode selection portion selects one of a first notification mode and a second notification mode according to a selection operation. The notification processing portion executes, when the first notification mode is selected, empty state notification processing for outputting information representing the developer-empty state to a preset notification destination every time the developer-empty state is detected by the remaining amount detection portion for each of the plurality of developer storage units, and executes, when the second notification mode is selected, the empty state notification processing when the developer-empty state of some of the plurality of developer storage units is detected by the remaining amount detection portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

[Configuration of Image Forming Apparatus 10]

Figure 1:
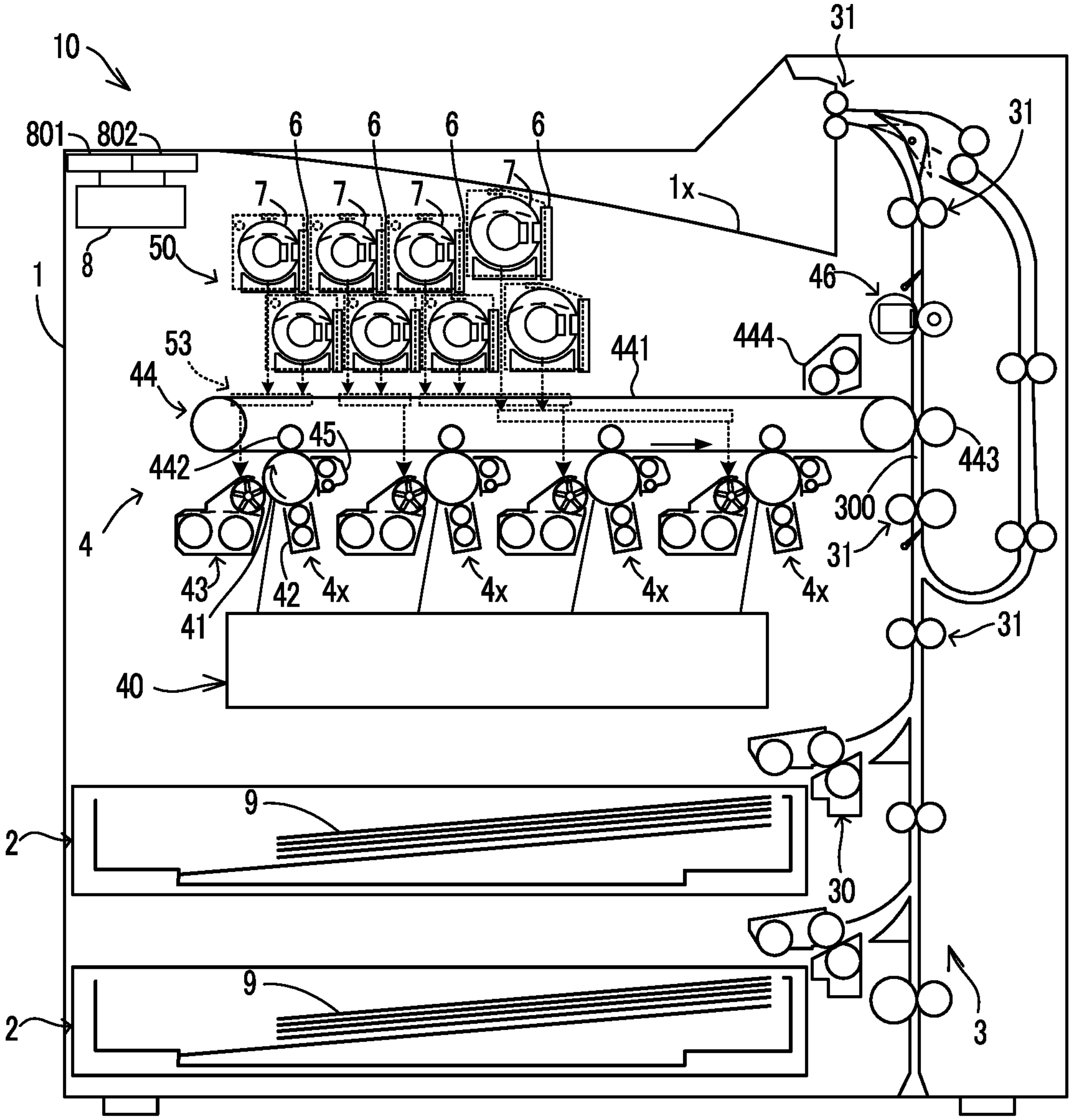
FIG. 1 is a configuration diagram of an image forming apparatus according to an embodiment.

An image forming apparatus 10 according to the embodiment is capable of executing print processing for forming an image on a sheet 9. The image forming apparatus 10 shown in FIG. 1 is a printer. It is noted that the image forming apparatus 10 may alternatively be a copying machine, a facsimile apparatus, a multifunction peripheral, or the like.

As shown in FIG. 1, the image forming apparatus 10 includes a main housing 1, a sheet storing portion 2, a conveying device 3, a printing device 4, a toner supplying portion 50, a control device 8, an operation device 801, and a display device 802.

The main housing 1 is a housing that accommodates the conveying device 3, the printing device 4, the toner supplying portion 50, and the control device 8. A conveying path 300 as a path of the sheet 9 is also provided inside the main housing 1.

The conveying device 3 includes a sheet feed mechanism 30 and a plurality of conveying roller pairs 31. The sheet feed mechanism 30 feeds the sheets 9 stored in the sheet storing portion 2 one by one to the conveying path 300.

The plurality of conveying roller pairs 31 convey the sheet 9 along the conveying path 300. One of the plurality of conveying roller pairs 31 discharges the sheet 9 on which an image has been formed by the printing device 4 onto a discharge tray 1*x* from the conveying path 300.

The printing device 4 executes the print processing on the sheet 9 conveyed along the conveying path 300. The printing device 4 is an example of a printing portion which forms an image on the sheet 9. In the example shown in FIG. 1, the printing device 4 executes the print processing using electrophotography.

The printing device 4 that uses electrophotography includes an exposure device 40, one or more image forming portions 4*x*, a transfer device 44, and a fixing device 46. The printing device 4 shown in FIG. 1 is a tandem-type color printing device. In this case, the printing device 4 includes a plurality of image forming portions 4*x* respectively corresponding to a plurality of development colors.

In the example shown in FIG. 1, the printing device 4 includes four image forming portions 4*x* respectively corresponding to the development colors of yellow, magenta, cyan, and black.

Each of the image forming portions 4*x* includes a photoconductor 41, a charging device 42, a developing device 43, and a first cleaning device 45. The photoconductor 41 rotates so that the charging device 42 charges a surface of the photoconductor 41.

The exposure device 40 scans laser light on the charged surface of the photoconductor 41 to write an electrostatic latent image on the surface of the photoconductor 41. The developing device 43 supplies toner to the surface of the photoconductor 41 to develop the electrostatic latent image into a toner image.

The transfer device 44 transfers the toner image formed on the surface of the photoconductor 41 onto the sheet 9 conveyed along the conveying path 300.

In the tandem-type printing device 4, the transfer device 44 includes an intermediate transfer belt 441, a plurality of primary transfer devices 442, a secondary transfer device 443, and a second cleaning device 444. The plurality of primary transfer devices 442 are provided in correspondence with the plurality of image forming portions 4*x*.

The intermediate transfer belt 441 rotates in a state where a part thereof moves along the plurality of image forming portions 4*x*. The plurality of primary transfer devices 442 transfer the toner images formed on the surfaces of the photoconductors 41 of the plurality of image forming portions 4*x* onto a surface of the intermediate transfer belt 441. Thus, a color toner image obtained by superimposing the toner images of the plurality of colors is formed on the surface of the intermediate transfer belt 441.

The secondary transfer device 443 transfers the color toner image formed on the surface of the intermediate transfer belt 441 onto the sheet 9. The fixing device 46 heats and pressurizes the color toner image on the sheet 9 to fix the color toner image onto the sheet 9.

The toner supplying portion 50 supplies toner to the developing device 43 of each of the plurality of image forming portions 4*x* in the printing device 4. The toner supplying portion 50 includes a plurality of attachment portions 5. Each of the attachment portions 5 is a portion to which a toner container 7 is detachably attached.

The toner supplying portion 50 supplies the toner in the plurality of toner containers 7 attached to the plurality of attachment portions 5 to the developing devices 43 of the plurality of image forming portions 4*x* for each of the development colors.

It is noted that the sheet 9 is a sheet-type image forming medium such as a paper sheet. The toner is an example of the developer. Each of the toner containers 7 is an example of a developer storage unit which stores developer.

The operation device 801 is a device which accepts user operations. For example, the operation device 801 includes one or both of a touch panel and operation buttons.

The display device 802 is capable of displaying various types of information. For example, the display device 802 is a panel display device such as a liquid crystal display device. The control device 8 controls various electrical devices provided in the image forming apparatus 10.

Figure 2:
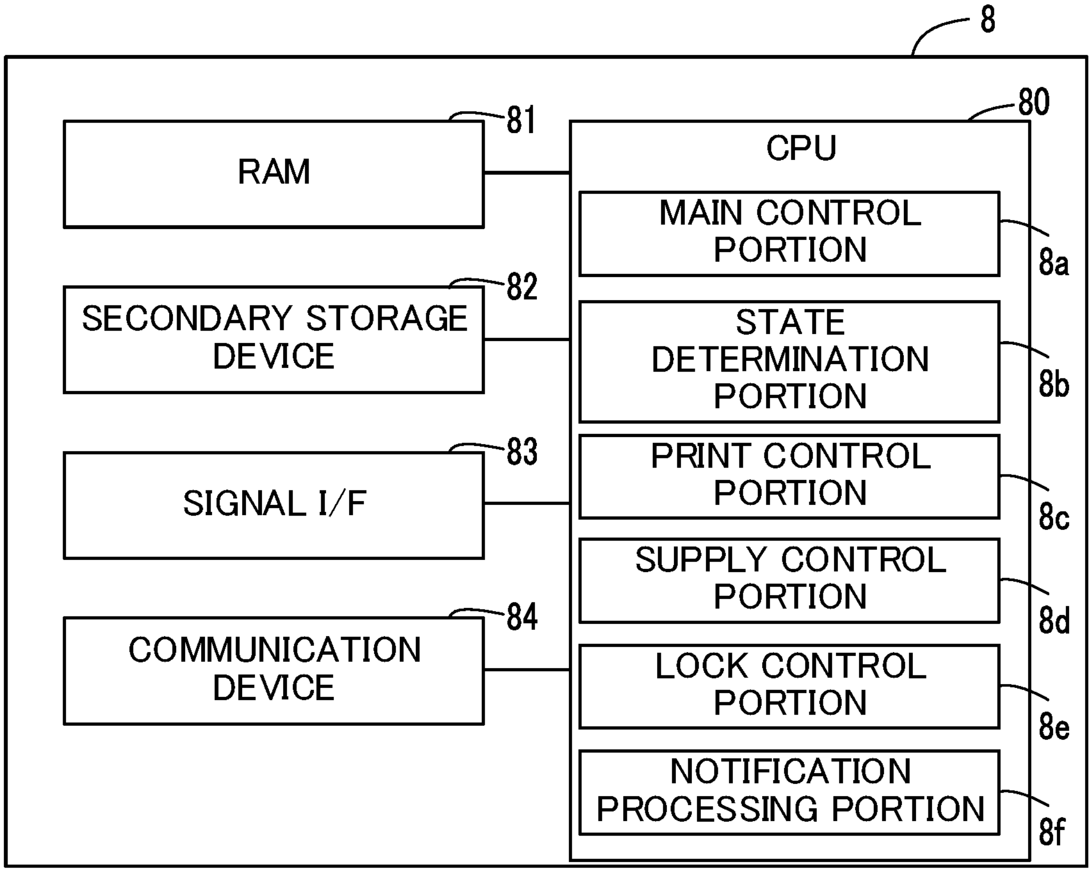
FIG. 2 is a block diagram showing a configuration of a control device in the image forming apparatus according to the embodiment.

As shown in FIG. 2, the control device 8 includes a CPU (Central Processing Unit) 80, a RAM (Random Access Memory) 81, a secondary storage device 82, a signal interface 83, a communication device 84, and the like.

The CPU 80 executes computer programs to execute various types of control and data processing. The RAM 81 temporarily stores the computer programs to be executed by the CPU 80 and various types of data.

The secondary storage device 82 is a non-volatile computer-readable storage device. The secondary storage device 82 stores the computer programs to be executed by the CPU 80 and various types of data. For example, one or both of a flash memory and a hard disk drive is/are adopted as the secondary storage device 82.

The signal interface 83 converts detection signals of various sensors into digital detection data. The detection data is transmitted to the CPU 80.

The communication device 84 executes communication with a plurality of external devices including one or more host apparatuses via a network. The CPU 80 executes communication with each of the external devices via the communication device 84. The host apparatus is an information processing apparatus which requests the image forming apparatus 10 to execute the print processing.

The CPU 80 includes a plurality of processing modules that are realized by executing the computer programs. The plurality of processing modules include a main control portion 8*a*, a state determination portion 8*b*, a print control portion 8*c*, a supply control portion 8*d*, and the like (see FIG. 2).

The main control portion 8*a* executes control for causing the other modules to execute processing of accepting various requests and processing corresponding to the requests. For example, the main control portion 8*a* accepts a print request via the operation device 801 or the communication device 84. In addition, the main control portion 8*a* causes the print control portion 8*c* to execute processing corresponding to the print request.

The state determination portion 8*b* determines various states of the image forming apparatus 10 according to detection states of various sensors and operation states of various devices in the image forming apparatus 10.

The print control portion 8*c* controls the conveying device 3 and the printing device 4. While causing the conveying device 3 to convey the sheet 9, the print control portion 8*c* causes the printing device 4 to execute the print processing.

The supply control portion 8*d* controls the toner supplying portion 50 to control supply of toner from the toner supplying portion 50 to the printing device 4.

Figure 3:
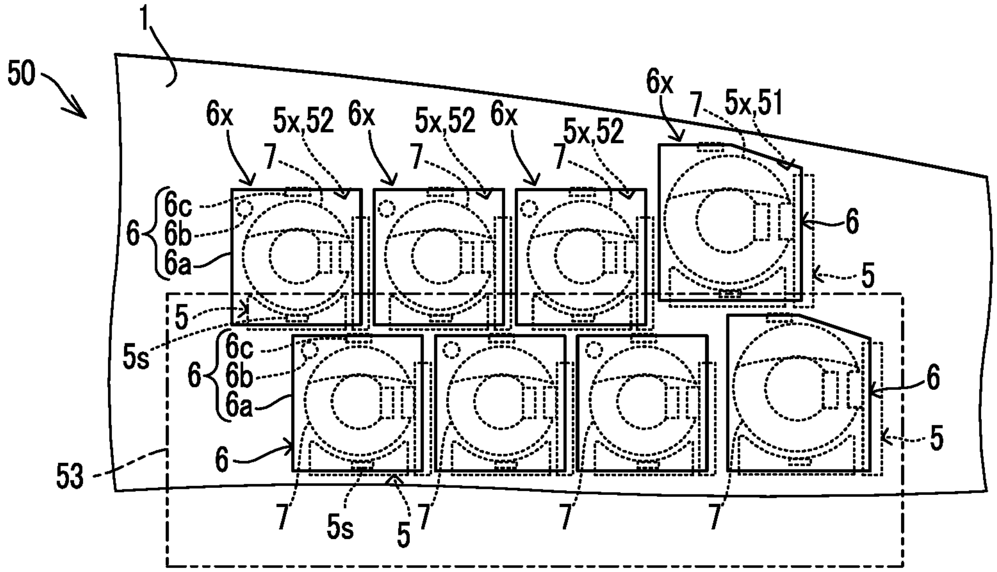
FIG. 3 is a configuration diagram of a toner supplying portion in the image forming apparatus according to the embodiment.

In the present embodiment, the toner supplying portion 50 includes a pair of attachment portions 5 for each of the plurality of development colors (see FIG. 3). The toner supplying portion 50 includes the pair of attachment portions 5 for each of the toner in the four colors of yellow, magenta, cyan, and black.

In other words, two toner containers 7 that store toner of the same color can be attached to the toner supplying portion 50. Thus, in the image forming apparatus 10, the downtime is not caused even during replacement of the toner container 7.

Incidentally, a user or administrator of the image forming apparatus 10 replaces the toner container 7 when a toner-empty state of the toner containers 7 is detected.

The toner-empty state is a state where there is no more toner left in the toner container 7. It is noted that a toner-remaining state is a state where there is still toner remaining in the toner container 7. The toner-empty state is an example of a developer-empty state, and the toner-remaining state is an example of a developer-remaining state.

In addition, when a state where a remaining toner amount in each of the toner containers 7 is low is detected, the user or the administrator may order the toner containers 7 for stock.

When the image forming apparatus 10 includes a plurality of attachment portions 5 for each of the development colors, various operations are conceivable regarding the ordering or replacement of the toner containers 7, and the like. Therefore, it is desirable for the image forming apparatus 10 to be capable of meeting the need for the various operations by the user or the administrator.

Hereinafter, the configuration and functions of the image forming apparatus 10 for meeting the need for the various operations by the user or the administrator will be described.

The toner supplying portion 50 includes four attachment portion sets 5*x* (see FIG. 3). The four attachment portion sets 5*x* respectively correspond to toner of yellow, magenta, cyan, and black. Yellow, magenta, cyan, and black are each an example of the development color.

The four attachment portion sets 5*x* each include the pair of attachment portions 5. Accordingly, the toner supplying portion 50 includes eight attachment portions 5. In each of the four attachment portion sets 5*x*, two toner containers 7 of the same color are attached to the pair of attachment portions 5.

The four attachment portion sets 5*x* include one black-color attachment portion set 51 corresponding to black toner and three chromatic attachment portion sets 52 corresponding to toner of three chromatic colors. The three chromatic attachment portion sets 52 respectively correspond to yellow, magenta, and cyan.

In the example shown in FIG. 3, the pair of toner containers 7 attached to the one black-color attachment portion set 51 have a larger toner storage amount than the three pairs of toner containers 7 attached to the three chromatic attachment portion sets 52.

The toner supplying portion 50 further includes a supplying mechanism 53 and eight lock mechanisms 6 and eight toner amount sensors 5*s* corresponding to the eight attachment portions 5.

As will be described later, in each of the four attachment portion sets 5*x*, one of the pair of attachment portions 5 is selected as a target attachment portion. In descriptions below, one of the pair of toner containers 7 that is attached to the target attachment portion in each of the four attachment portion sets 5*x* will be referred to as a target container. The target container is an example of a target storage unit.

For each of the four attachment portion sets 5*x*, the supplying mechanism 53 supplies toner from the target container to the corresponding developing device 43. In other words, the target container becomes a toner supply source for the supplying mechanism 53 in each of the four attachment portion sets 5*x*.

The eight lock mechanisms 6 are sorted into four lock mechanism sets 6*x* respectively corresponding to the four attachment portion sets 5*x* (see FIG. 3). The four lock mechanism sets 6*x* correspond to the one black-color attachment portion set 51 and the three chromatic attachment portion sets 52. The four lock mechanism sets 6*x* each include a pair of lock mechanisms 6 corresponding to the pair of attachment portions 5.

It is noted that the eight lock mechanisms 6 can be considered as four pairs of lock mechanisms 6 corresponding to the four attachment portion sets 5*x*. Similarly, the eight toner amount sensors 5*s* can be considered as four pairs of toner amount sensors 5*s* corresponding to the four attachment portion sets 5*x*.

The eight toner amount sensors 5*s* respectively detect toner amounts in the eight toner containers 7 attached to the eight attachment portions 5. For example, each of the toner amount sensors 5*s* is a permeability sensor.

It is noted that each of the toner amount sensors 5*s* may be a plurality of photosensors that detect a toner retention level of each of the toner containers 7. Alternatively, each of the toner amount sensors 5*s* may be a load cell that measures a weight of each of the toner containers 7.

The state determination portion 8*b* determines a remaining toner amount of each of the toner containers 7 respectively attached to the attachment portions 5 based on the detection results of the toner amount sensors 5*s*. In the present embodiment, the state determination portion 8*b* determines which of the toner-empty state and the toner-remaining state each of the toner containers 7 is in.

Under the condition that the toner-remaining state of the target container has been detected by the state determination portion 8*b*, the supply control portion 8*d* causes the supplying mechanism 53 to execute an operation of supplying toner of the target container to the developing device 43.

In other words, under the condition that the toner-remaining state of the target container has been detected, the supplying mechanism 53 executes the operation of supplying toner of the target container to the developing device 43.

In addition, the state determination portion 8*b* determines whether each of the toner containers 7 is in a low-toner-amount state as one type of the toner-remaining state. The low-toner-amount state is a state where the remaining toner amount of one of the plurality of toner containers 7 as the determination target is lower than a reference amount. The low-toner-amount state is an example of a low-developer-amount state.

The reference amount is determined in advance. For example, the main control portion 8*a* can set the reference amount according to an operation to the operation device 801.

In addition, the state determination portion 8*b* determines which of an attached state and an unattached state each of the attachment portions 5 is in based on the detection results of the toner amount sensors 5*s*.

The attached state is a state where the toner container 7 is attached to one of the plurality of attachment portions 5 as the determination target. The unattached state is a state where the toner container 7 is not attached to one of the plurality of attachment portions 5 as the determination target.

In other words, the toner amount sensors 5*s* also function as attachment sensors that detect which of the attached state and the unattached state the respective attachment portions 5 are in.

When determining that one of the plurality of attachment portions 5 as the determination target is in the attached state, the state determination portion 8*b* executes processing of determining the toner-empty state or the toner-remaining state. In each of the attachment portions 5, the unattached state is an indefinite state where it is neither the toner-empty state nor the toner-remaining state.

The plurality of toner amount sensors 5*s* and the state determination portion 8*b* are each an example of a remaining amount detection portion which detects a remaining toner amount in the eight toner containers 7 attached to the eight attachment portions 5. The toner-empty state, the toner-remaining state, and the low-toner-amount state determined by the state determination portion 8*b* are each an example of a detection state of the remaining amount detection portion.

In the present embodiment, the state determination portion 8*b* determining the remaining toner amount is synonymous with the state determination portion 8*b* detecting the remaining toner amount.

For example, the state determination portion 8*b* periodically detects the remaining toner amount of each of the toner containers 7. The state determination portion 8*b* may periodically determine which of the attached state and the unattached state each of the attachment portions 5 is in, and further detect the remaining toner amount of each of the toner containers 7 every time the print processing is executed.

Each of the lock mechanisms 6 is a mechanism that can be selectively switched between a locked state and an unlocked state.

The locked state of each of the lock mechanisms 6 is a state where each of the toner containers 7 cannot be removed from the corresponding one of the attachment portions 5. The unlocked state of each of the lock mechanisms 6 is a state where each of the toner containers 7 can be removed from the corresponding one of the attachment portions 5.

In the present embodiment, each of the lock mechanisms 6 includes a container cover 6*a*, a cover sensor 6*b*, and a cover latch mechanism 6*c*. The container cover 6*a* can open and close an opening that communicates with one of the eight attachment portions 5 in the main housing 1.

According to an input lock control signal, the cover latch mechanism 6*c* is selectively switched between a state where the container cover 6*a* is latched at a closing position and a state where the latch of the container cover 6*a* is released.

For example, the cover latch mechanism 6*c* includes a solenoid whose state is switched according to the lock control signal, and the like.

The state where the cover latch mechanism 6*c* latches the container cover 6*a* at the closing position is the locked state of the lock mechanism 6. The state where the cover latch mechanism 6*c* has released the latch of the container cover 6*a* is the unlocked state of the lock mechanism 6.

The cover sensor 6*b* detects which of a cover-opened state and a cover-closed state the container cover 6*a* is in. The cover-closed state is a state where the container cover 6*a* is present at the closing position. The cover-opened state is a state where the container cover 6*a* is not present at the closing position.

When each of the toner containers 7 is attached/detached to/from the corresponding one of the attachment portions 5, the corresponding container cover 6*a* is opened. For example, the cover sensor 6*b* is a non-contact photosensor, a contact-type microswitch, or the like.

The plurality of processing modules in the CPU 80 further include a lock control portion 8*e* (see FIG. 2). The lock control portion 8*e* outputs the lock control signal to the cover latch mechanism 6*c* of each of the lock mechanisms 6 to thus control each of the lock mechanisms 6.

The lock control portion 8*e* outputs the lock control signal to control each of the lock mechanisms 6 to be in one of the locked state and the unlocked state.

For each of the four attachment portion sets 5*x*, the supply control portion 8*d* selects one target attachment portion from the pair of attachment portions 5. The supply control portion 8*d* selects one target attachment portion for each of the four attachment portion sets 5*x*.

In descriptions below, one of the pair of toner containers 7 that is attached to the target attachment portion in each of the attachment portion sets 5*x* will be referred to as the target container. In each of the attachment portion sets 5*x*, the target container becomes the toner supply source for the supplying mechanism 53.

As an initial state, the supply control portion 8*d* selects one of the pair of attachment portions 5 as the target attachment portion. After that, when the determination state of the state determination portion 8*b* regarding the target container changes from the toner-remaining state to the toner-empty state, the supply control portion 8*d* selects a new target attachment portion.

It is noted that the supply control portion 8*d* which executes the processing of selecting the target attachment portion is an example of a target selection portion.

[Operation Mode Selection Processing]

The main control portion 8*a* executes operation mode selection processing when an operation mode selection start event occurs.

For example, the operation mode selection start event is detection of an operation mode selection start operation by the operation device 801. Alternatively, the operation mode selection start event may be reception of a start command from an external terminal device by the communication device 84.

The operation mode selection processing is processing of selecting one of a first operation mode and a second operation mode according to a selection operation. The main control portion 8*a* which executes the operation mode selection processing is an example of an operation mode selection portion. The second operation mode is an example of a specific operation mode.

For example, the selection operation is an operation to the operation device 801. Alternatively, the selection operation may be an operation to an external terminal device communicable with the communication device 84.

Figure 4:
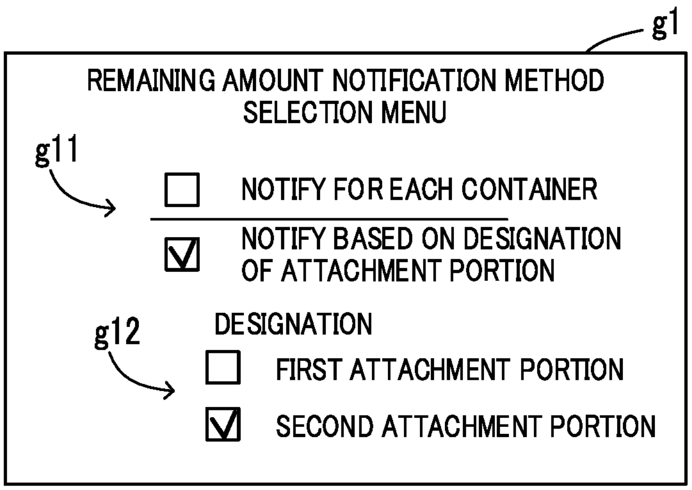
FIG. 4 is a diagram showing a first example of a remaining amount notification method selection screen in the image forming apparatus according to the embodiment.

For example, the main control portion 8*a* outputs a first menu screen g1 as shown in FIG. 4 in the operation mode selection processing. An output destination of the first menu screen g1 is the display device 802 of the image forming apparatus 10 or the external terminal device.

The first menu screen g1 includes a remaining amount notification method selection menu g11 for selecting one of two candidates for the remaining amount notification method.

The main control portion 8*a* selects one of "notify for each container" and "notify based on designation of attachment portion" according to the selection operation on the remaining amount notification method selection menu g11. The selection of "notify for each container" is a selection of the first operation mode. The selection of "notify based on designation of attachment portion" is a selection of the second operation mode.

The first menu screen g1 further includes a designated attachment portion selection menu g12. The main control portion 8*a* selects, as a designated attachment portion, one of the pair of attachment portions 5 in each of the four attachment portion sets 5*x* according to the selection operation on the designated attachment portion selection menu g12.

The selection of the designated attachment portion is effective in the case where the second operation mode is selected. The designated attachment portion is an example of a specific attachment portion corresponding to the second operation mode.

The plurality of processing modules in the CPU 80 further include a notification processing portion 8*f* (see FIG. 2).

[First Operation Mode]

Figure 5:
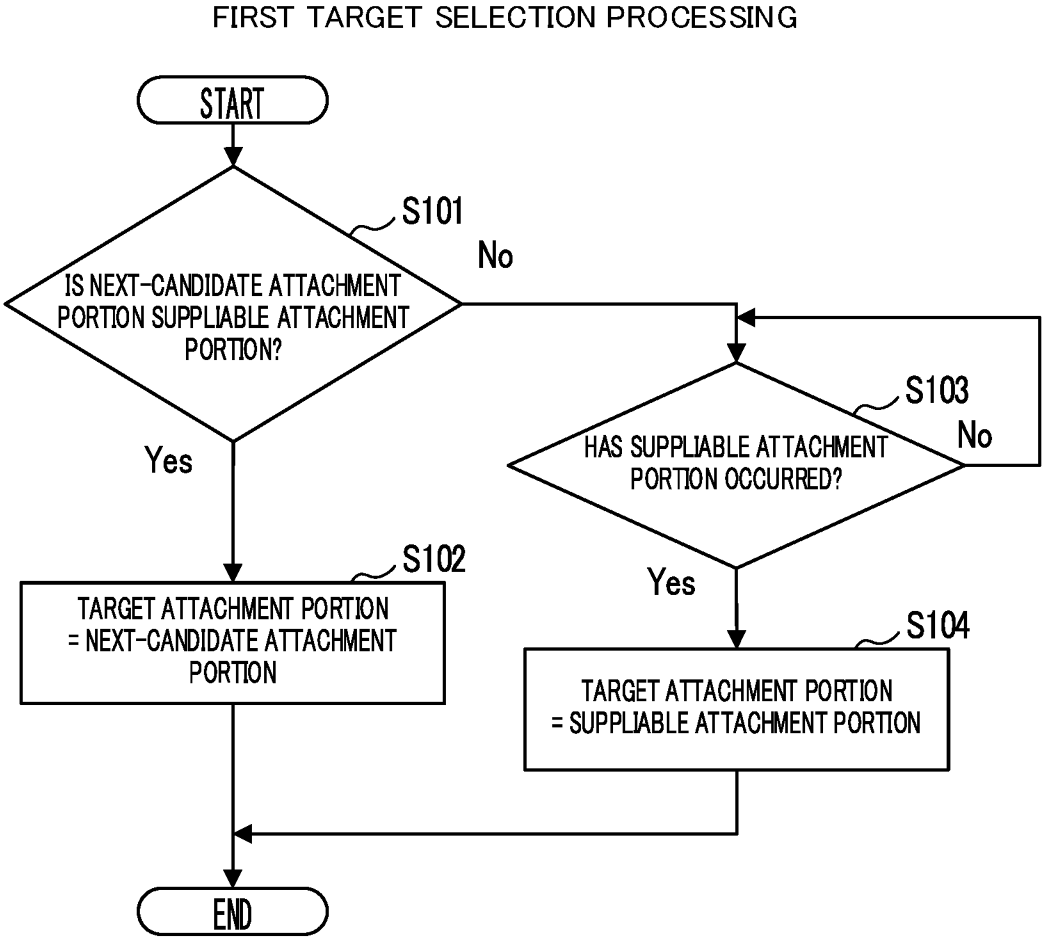
FIG. 5 is a flowchart showing exemplary procedures of first target selection processing in the image forming apparatus according to the embodiment.

The supply control portion 8*d* executes first target selection processing to be described later when the detection state of the state determination portion 8*b* regarding the target container changes from the toner-remaining state to the toner-empty state under the situation where the first operation mode is being selected (see FIG. 5).

When the first operation mode is selected, the lock control portion 8*e* periodically executes first automatic lock control to be described later (see FIG. 6).

When the first operation mode is selected, the notification processing portion 8*f* executes first remaining amount notification processing to be described later (see FIG. 7). The first remaining amount notification processing is processing of notifying a specific detection state of the remaining toner amount obtained by the state determination portion 8*b*.

[First Operation Mode: First Target Selection Processing]

Hereinafter, exemplary procedures of the first target selection processing will be described with reference to the flowchart shown in FIG. 5. The supply control portion 8*d* executes the first target selection processing for each of the four attachment portion sets 5*x*.

In descriptions below, S101, S102, . . . represent identification codes of a plurality of steps in the first target selection processing. In the first target selection processing, processing of Step S101 is executed first.

<Step S101>

In Step S101, the supply control portion 8*d* determines processing to execute next according to whether or not the next-candidate attachment portion is a suppliable attachment portion.

The next-candidate attachment portion is a candidate for the next target attachment portion that is specified based on a predetermined order in each of the four attachment portion sets 5*x*.

In the present embodiment, the predetermined order is an order in which the pair of attachment portions 5 are selected alternately. Accordingly, the next-candidate attachment portion is one of the pair of attachment portions 5 that is not the target attachment portion.

It is noted that when each of the four attachment portion sets 5*x* includes three or more attachment portions 5, the predetermined order is an order in which the plurality of attachment portions 5 are arranged in each of the four attachment portion sets 5*x*.

The suppliable attachment portion is the attachment portion 5 to which the toner container 7 for which the toner-remaining state has been detected by the state determination portion 8*b* is attached. On the other hand, an un-suppliable attachment portion is the attachment portion 5 to which the toner container 7 for which the toner-empty state has been detected by the state determination portion 8*b* is attached.

When the next-candidate attachment portion is the suppliable attachment portion, the supply control portion 8*d* executes processing of Step S102. On the other hand, when the next-candidate attachment portion is not the suppliable attachment portion, the supply control portion 8*d* executes processing of Step S103.

In descriptions below, one of the pair of toner containers 7 that is attached to the next-candidate attachment portion in each of the four attachment portion sets 5*x* will be referred to as a next-candidate container.

The supply control portion 8*d* executes the processing of Step S102 when the toner-remaining state of the next-candidate container is detected by the state determination portion 8*b*. On the other hand, the supply control portion 8*d* executes the processing of Step S103 when the toner-remaining state of the next-candidate container is not detected by the state determination portion 8*b*.

In the present embodiment, the processing of Step S103 is executed when the toner-empty state of both of the pair of toner containers 7 is detected.

<Step S102>

In Step S102, the supply control portion 8*d* selects the next-candidate attachment portion as the new target attachment portion.

In other words, the supply control portion 8*d* selects the next-candidate attachment portion as the new target attachment portion when the toner-remaining state of the next-candidate container is detected by the state determination portion 8*b*.

After executing the processing of Step S102, the supply control portion 8*d* ends the first target selection processing.

<Step S103>

In Step S103, the supply control portion 8*d* stands by until the suppliable attachment portion occurs in the attachment portion set 5*x*.

By replacing the toner container 7 in either of the pair of attachment portions 5, the suppliable attachment portion occurs in the attachment portion set 5*x*.

The supply control portion 8*d* executes processing of Step S104 when the suppliable attachment portion occurs in the attachment portion set 5*x*.

<Step S104>

In Step S104, the supply control portion 8*d* selects, as the new target attachment portion, one of the pair of attachment portions 5 that has become the suppliable attachment portion first.

The processing of Step S103 and Step S104 is an example of processing of selecting a new target attachment portion from the suppliable attachment portion in the pair of attachment portions 5.

After executing the processing of Step S104, the supply control portion 8*d* ends the first target selection processing.

The supply control portion 8*d* executes the first target selection processing every time the toner-remaining state of the newly-selected target attachment portion is detected.

As described heretofore, when the first operation mode is selected, the supply control portion 8*d* selects the new target attachment portion by the processing of Step S101 to Step S104.

In Step S101 to Step S104, the supply control portion 8*d* selects a new target attachment portion from a plurality of candidates including the next-candidate attachment portion in accordance with the detection state of the remaining toner amount regarding the next-candidate container.

Specifically, when the toner-remaining state of the next-candidate container is detected by the state determination portion 8*b*, the supply control portion 8*d* selects the next-candidate attachment portion as the new target attachment portion (see Step S101 and Step S102).

On the other hand, when the toner-remaining state of the next-candidate container is not detected by the state determination portion 8*b*, the supply control portion 8*d* selects the suppliable attachment portion as the new target attachment portion (see Step S101, Step S103, and Step S104).

More specifically, in Step S103 and Step S104, the supply control portion 8*d* selects, as the new target attachment portion, one of the pair of attachment portions 5 that has become the suppliable attachment portion first. This selection processing is an example of the processing of selecting, as the new target attachment portion, the suppliable attachment portion from among the plurality of attachment portions 5.

By executing the first target selection processing, the new target attachment portion is selected according to the predetermined order in principle (see Step S102).

However, when the toner-remaining state of the next-candidate container is not detected, the suppliable attachment portion other than the next-candidate attachment portion may be selected as the new target attachment portion as an exception (see Step S104).

<First Operation Mode: First Automatic Lock Control>

Next, exemplary procedures of the first automatic lock control will be described with reference to the flowchart shown in FIG. 6. The lock control portion 8*e* executes the first automatic lock control for each of the four lock mechanism sets 6*x*.

In descriptions below, S201, S202, . . . represent identification codes of a plurality of steps in the first automatic lock control. In the first automatic lock control, processing of Step S201 is executed first.

<Step S201>

In Step S201, the lock control portion 8*e* sets an un-suppliable lock mechanism out of the pair of lock mechanisms 6 to the unlocked state.

The un-suppliable lock mechanism is the lock mechanism 6 corresponding to the un-suppliable attachment portion. In other words, the un-suppliable lock mechanism is the lock mechanism 6 corresponding to the toner container 7 for which the toner-remaining state has not been detected.

It is noted that when both of the pair of lock mechanisms 6 are not the un-suppliable lock mechanism, the processing of Step S201 is omitted.

The lock control portion 8*e* executes processing of Step S202 following the processing of Step S201.

<Step S202>

In Step S202, the lock control portion 8*e* sets a suppliable lock mechanism out of the pair of lock mechanisms 6 to the locked state.

The suppliable lock mechanism is the lock mechanism 6 corresponding to the suppliable attachment portion. In other words, the suppliable lock mechanism is the lock mechanism 6 corresponding to the toner container 7 for which the toner-remaining state has been detected.

By executing the processing of Step S202, the toner container 7 in the toner-remaining state is prevented from being removed from either of the pair of attachment portions 5.

It is noted that when both of the pair of lock mechanisms 6 are not the suppliable lock mechanism, the processing of Step S202 is omitted. After that, the lock control portion 8*e* repeats the processing of Step S201 and Step S202.

As described heretofore, when the first operation mode is selected, the lock control portion 8*e* executes remaining-amount-compliant lock control for both of the pair of lock mechanisms 6 in each of the four attachment portion sets 5*x* (see Step S201 and Step S202).

The remaining-amount-compliant lock control is control to set each of the corresponding pair of lock mechanisms 6 to one of the locked state and the unlocked state according to the detection state of the remaining toner amount obtained by the state determination portion 8*b* for each of the pair of toner containers 7.

Specifically, the lock control portion 8*e* sets the lock mechanism 6 corresponding to the toner container 7 for which the toner-remaining state has been detected to the locked state. On the other hand, the lock control portion 8*e* sets the lock mechanism 6 corresponding to the toner container 7 for which the toner-remaining state has not been detected to the unlocked state.

<First Operation Mode: First Remaining Amount Notification Processing>

Next, exemplary procedures of the first remaining amount notification processing will be described with reference to the flowchart shown in FIG. 7. The notification processing portion 8*f* executes the first remaining amount notification processing for each of the four attachment portion sets 5*x*.

In descriptions below, S301, S302, . . . represent identification codes of a plurality of steps in the first remaining amount notification processing. In the first remaining amount notification processing, processing of Step S301 is executed first.

<Step S301>

In Step S301, the notification processing portion 8*f* stands by until the low-toner-amount state of the target container is detected by the state determination portion 8*b*.

The notification processing portion 8*f* executes processing of Step S302 when the low-toner-amount state of the target container is detected by the state determination portion 8*b*.

<Step S302>

In Step S302, the notification processing portion 8*f* outputs remaining amount information representing that the low-toner-amount state has been detected to a preset notification destination. The notification destination in Step S302 is set in advance.

For example, the notification destination in Step S302 includes an order management server which executes automatic ordering processing of the toner containers 7 or an information terminal of an administrator who manages ordering of the toner containers 7. The order management server and the information terminal are some of the plurality of external devices communicable with the communication device 84.

Alternatively, the notification destination in Step S302 may include the display device 802 of the image forming apparatus 10.

After executing the processing of Step S302, the notification processing portion 8*f* executes the processing of Step S301.

As described heretofore, when the first operation mode is selected, the notification processing portion 8*f* executes the processing of Step S302 every time the low-toner-amount state of the target container is detected by the state determination portion 8*b*. The processing of Step S302 is an example of remaining amount state notification processing.

By executing the first remaining amount notification processing, it becomes easy to realize an operation of replenishing the stock of the toner container 7 every time one toner container 7 becomes empty.

[Second Operation Mode]

The supply control portion 8*d* executes the second target selection processing to be described later when the detection state of the state determination portion 8*b* regarding the target container changes from the toner-remaining state to the toner-empty state under a situation where the second operation mode is being selected (see FIG. 8).

Figure 9:
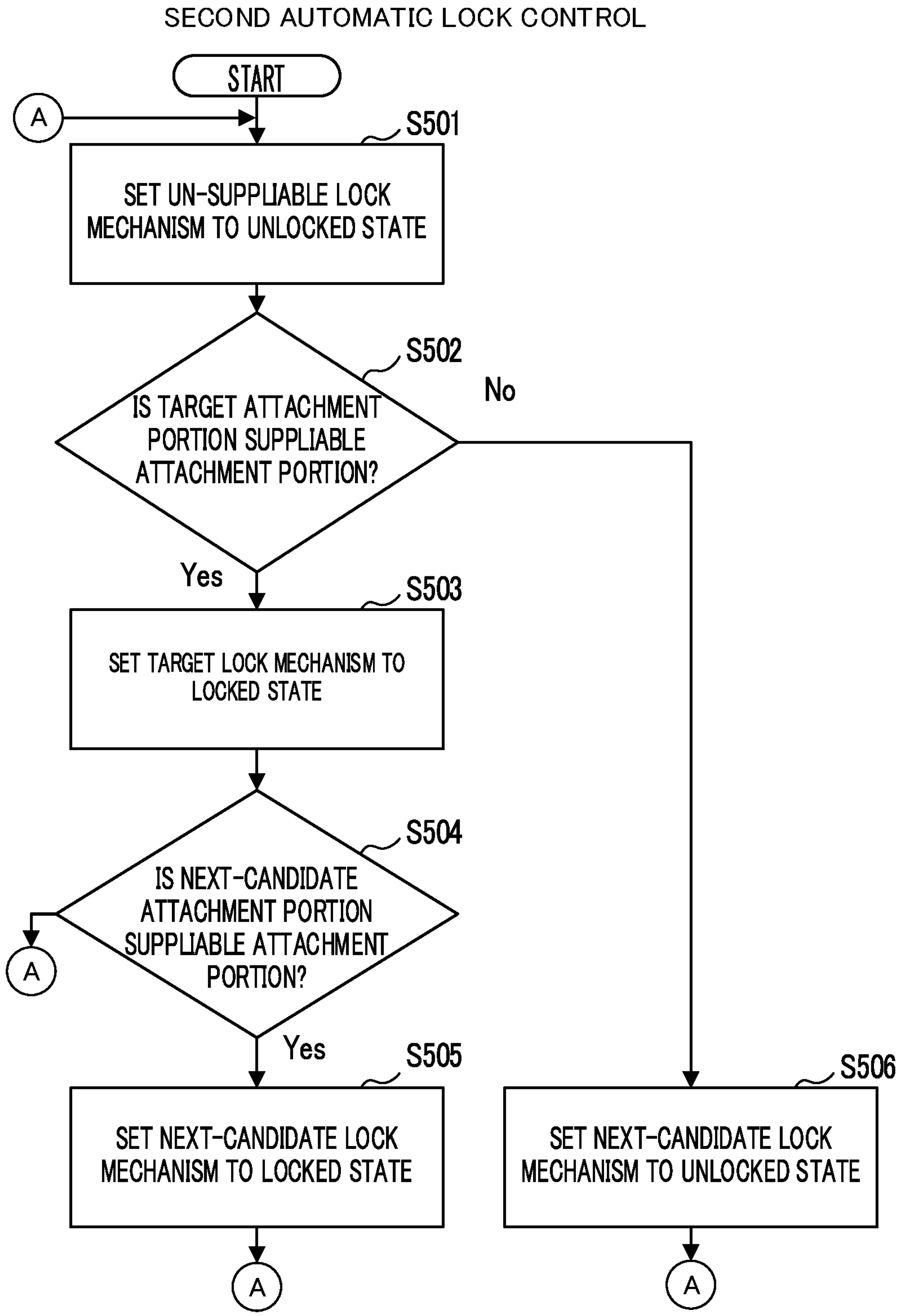
FIG. 9 is a flowchart showing exemplary procedures of second automatic lock processing in the image forming apparatus according to the embodiment.

When the second operation mode is selected, the lock control portion 8*e* periodically executes second automatic lock control to be described later (see FIG. 9).

Figure 10:
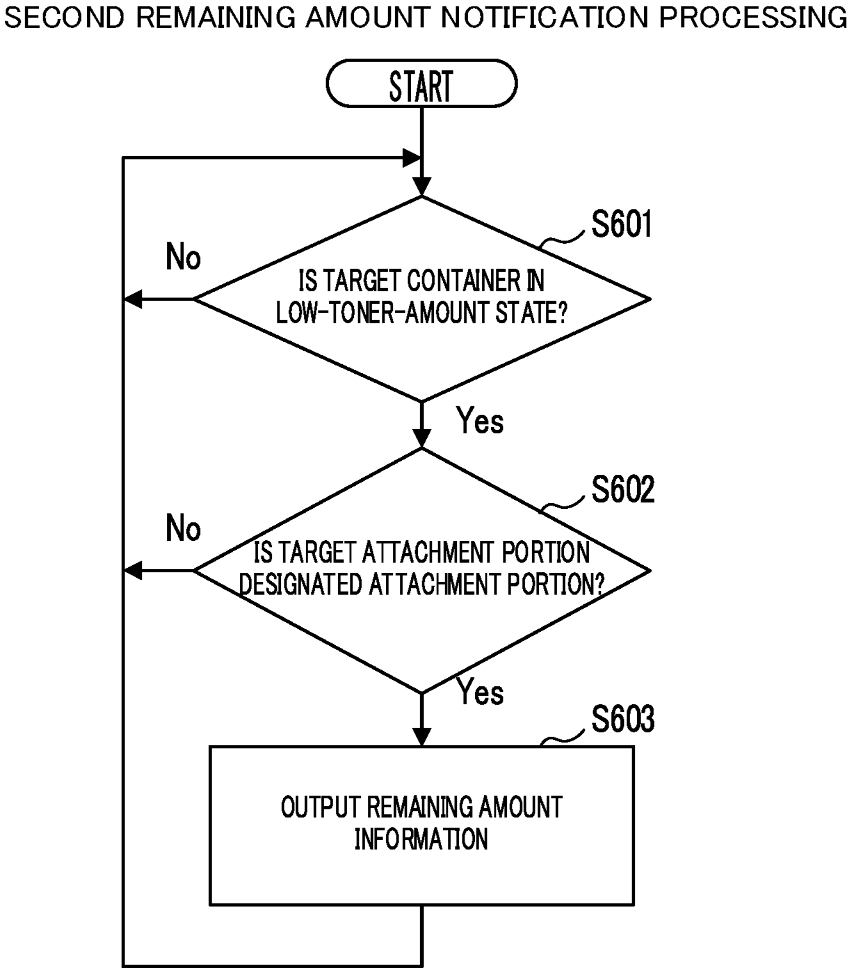
FIG. 10 is a flowchart showing exemplary procedures of second remaining amount notification processing in the image forming apparatus according to the embodiment.

When the second operation mode is selected, the notification processing portion 8*f* executes the second remaining amount notification processing to be described later (see FIG. 10). The second remaining amount notification processing is processing corresponding to the second remaining amount notification processing in the second operation mode.

[Second Operation Mode: Second Target Selection Processing]

Hereinafter, exemplary procedures of the second target selection processing will be described with reference to the flowchart shown in FIG. 8. The supply control portion 8*d* executes the second target selection processing for each of the four attachment portion sets 5*x*.

In descriptions below, S401, S402, . . . represent identification codes of a plurality of steps in the second target selection processing. In the second target selection processing, processing of Step S401 is executed first.

<Step S401>

In Step S401, the supply control portion 8*d* selects the next-candidate attachment portion as the new target attachment portion.

The processing of Step S401 is executed irrespective of the detection state of the remaining toner amount regarding the next-candidate container. The supply control portion 8*d* subsequently executes processing of Step S402.

As described above, the next-candidate container is the toner container 7 attached to the next-candidate attachment portion. In addition, the next-candidate attachment portion is a candidate for the next target attachment portion that is specified from the pair of toner containers 7 based on the predetermined order.

<Step S402>

In Step S402, the supply control portion 8*d* determines processing to execute next according to whether or not the newly-selected target attachment portion is the suppliable attachment portion.

When the newly-selected target attachment portion is the suppliable attachment portion, the supply control portion 8*d* ends the second target selection processing.

In other words, the supply control portion 8*d* ends the second target selection processing when the toner-remaining state of the new target container is detected by the state determination portion 8*b*.

On the other hand, when the newly-selected target attachment portion is not the suppliable attachment portion, the supply control portion 8*d* executes processing of Step S403.

In other words, the supply control portion 8*d* executes the processing of Step S403 when the toner-remaining state of the new target container is not detected by the state determination portion 8*b*.

<Step S403>

In Step S403, the supply control portion 8*d* determines processing to execute next according to whether or not the next-candidate attachment portion is the suppliable attachment portion.

When the next-candidate attachment portion is the suppliable attachment portion, the supply control portion 8*d* executes processing of Step S404.

In other words, the supply control portion 8*d* executes the processing of Step S404 when the toner-remaining state of the next-candidate container is detected under the situation where the toner-remaining state of the target container is not detected.

On the other hand, when the next-candidate attachment portion is not the suppliable attachment portion, the supply control portion 8*d* executes the processing of Step S402.

In other words, the supply control portion 8*d* repeats the processing of Step S402 and Step S403 when the toner-remaining state is not detected for both of the pair of toner containers 7.

<Step S404>

In Step S404, the supply control portion 8*d* outputs first warning information to a preset notification destination.

In other words, the supply control portion 8*d* maintains a state where the first warning information is notified when the toner-remaining state of the next-candidate container is detected under the situation where the toner-remaining state of the newly-selected target container is not detected (Step S404). The next-candidate container is the toner container 7 other than the target container.

For example, the first warning information is information that prompts the toner container 7 to be preferentially attached to the target attachment portion. Alternatively, the first warning information may be information that prompts the toner container 7 attached to the next-candidate attachment portion to be moved to the target attachment portion.

The notification destination in Step S404 may include the display device 802 of the image forming apparatus 10.

Alternatively, the notification destination in Step S404 may include an information terminal of a user who is in charge of replacing the toner containers 7. The information terminal is a part of the plurality of external devices communicable with the communication device 84.

After executing the processing of Step S404, the supply control portion 8*d* executes the processing of Step S402.

As described above, the toner-remaining state and the toner-empty state are detected by the state determination portion 8*b*. It is noted that the next-candidate container is a toner container other than the target container out of the pair of toner containers 7. The supply control portion 8*d* that executes the processing of Step S404 is an example of a warning processing portion.

As described heretofore, when the second operation mode is selected, the supply control portion 8*d* selects the next-candidate attachment portion as the new target attachment portion irrespective of the detection state of the remaining toner amount regarding the next-candidate container (see Step S401).

Further, the first warning information is notified when the toner container 7 having toner left inside is attached to the next-candidate attachment portion instead of being attached to the newly-selected target attachment portion (see Step S404).

The notification of the first warning information is a notification that prompts the toner containers 7 to be replaced correctly according to the predetermined order.

<Second Operation Mode: Second Automatic Lock Control>

Next, exemplary procedures of the second automatic lock control will be described with reference to the flowchart shown in FIG. 9. The lock control portion 8*e* executes the second automatic lock control for each of the four lock mechanism sets 6*x*.

In descriptions below, S501, S502, . . . represent identification codes of a plurality of steps in the second automatic lock control. In the second automatic lock control, processing of Step S501 is executed first.

<Step S501>

Figure 6:
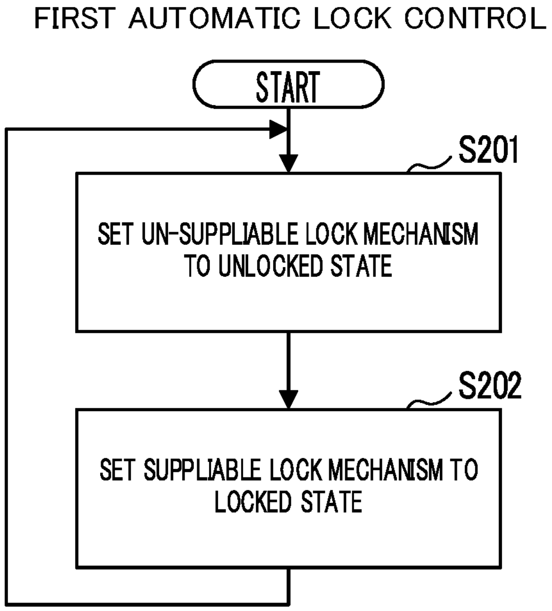
FIG. 6 is a flowchart showing exemplary procedures of first automatic lock processing in the image forming apparatus according to the embodiment.

In Step S501, similar to Step S201 of FIG. 6, the lock control portion 8*e* sets the un-suppliable lock mechanism out of the pair of lock mechanisms 6 to the unlocked state.

As described above, the un-suppliable lock mechanism is the lock mechanism 6 corresponding to the toner container 7 for which the toner-remaining state has not been detected.

It is noted that when both of the pair of lock mechanisms 6 are not the un-suppliable lock mechanism, the processing of Step S501 is omitted.

The lock control portion 8*e* executes processing of Step S502 following the processing of Step S501.

<Step S502>

In Step S502, the lock control portion 8*e* determines processing to execute next according to whether or not the target attachment portion is the suppliable attachment portion.

When the target attachment portion is the suppliable attachment portion, the lock control portion 8*e* executes processing of Step S503.

In other words, the lock control portion 8*e* executes the processing of Step S503 when the toner-remaining state of the target container is detected by the state determination portion 8*b*.

On the other hand, when the target attachment portion is not the suppliable attachment portion, the lock control portion 8*e* executes processing of Step S506.

In other words, the lock control portion 8*e* executes the processing of Step S506 when the toner-remaining state of the target container is not detected by the state determination portion 8*b*.

<Step S503>

In Step S503, the lock control portion 8*e* sets the target lock mechanism corresponding to the target attachment portion to the locked state.

As described above, the un-suppliable lock mechanism is the lock mechanism 6 corresponding to the toner container 7 for which the toner-remaining state has not been detected. By executing the processing of Step S503, the target container in the toner-remaining state is prevented from being removed from the target attachment portion.

The lock control portion 8*e* executes processing of Step S504 following the processing of Step S503.

<Step S504>

In Step S504, the lock control portion 8*e* determines processing to execute next according to whether or not the next-candidate attachment portion is the suppliable attachment portion.

When the next-candidate attachment portion is the suppliable attachment portion, the lock control portion 8*e* executes processing of Step S505.

In other words, the lock control portion 8*e* executes the processing of Step S505 when the toner-remaining state of the next-candidate container is detected under the situation where the toner-remaining state of the target container is detected.

On the other hand, when the next-candidate attachment portion is not the suppliable attachment portion, the lock control portion 8*e* executes the processing of Step S501. Thus, in Step S501, the next-candidate lock mechanism is maintained in the unlocked state.

The next-candidate lock mechanism is one of the pair of lock mechanisms 6 corresponding to the next-candidate attachment portion. As described above, the next-candidate attachment portion is a candidate for the next target attachment portion that is specified based on the predetermined order.

In other words, the lock control portion 8*e* maintains the next-candidate lock mechanism in the unlocked state in Step S501 when the toner-remaining state of the next-candidate container is not detected under the situation where the toner-remaining state of the target container is detected.

<Step S505>

In Step S505, the lock control portion 8*e* sets the next-candidate lock mechanism to the locked state.

By executing the processing of Step S505, the next-candidate container in the toner-remaining state is prevented from being removed from the next-candidate attachment portion.

After executing the processing of Step 505, the lock control portion 8*e* executes the processing of Step S501. Thus, the pair of lock mechanisms 6 are maintained in the locked state until the toner-empty state of the target container is detected.

<Step S506>

In Step S506, the lock control portion 8*e* sets the next-candidate lock mechanism to the unlocked state.

By executing the processing of Step S501 and Step S506, the next-candidate lock mechanism is set to the unlocked state irrespective of the state of the remaining toner amount of the next-candidate container.

After executing the processing of Step 506, the lock control portion 8*e* executes the processing of Step S501. Thus, removal of the next-candidate container is possible until the toner-remaining state of the target container is detected.

Figure 8:
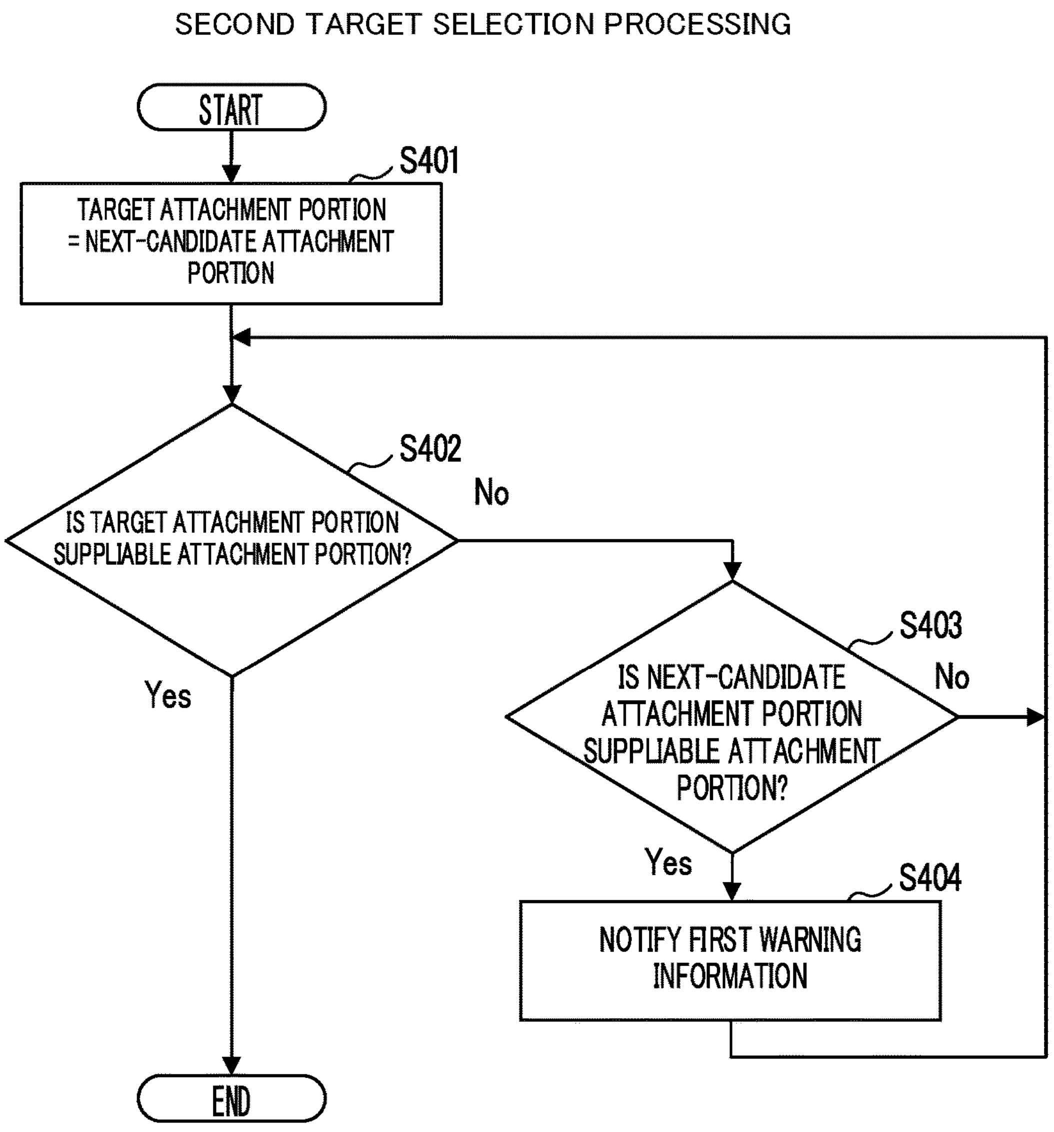
FIG. 8 is a flowchart showing exemplary procedures of second target selection processing in the image forming apparatus according to the embodiment.

When executing the processing of Step S506, the notification of the first warning information in Step S404 of FIG. 8 is executed.

By executing the processing of Step S506, in a case where the toner containers 7 are replaced contrary to the predetermined order, the toner container 7 attached to the next-candidate attachment portion is allowed to move to the target attachment portion.

As described heretofore, when the second operation mode is selected, the lock control portion 8*e* executes the remaining-amount-compliant lock control regarding the target lock mechanism out of the pair of lock mechanisms 6 (see Step S501 to Step S503).

On the other hand, for the lock mechanism other than the target lock mechanism out of the pair of lock mechanisms 6, the lock control portion 8*e* performs control under a rule different from that of the remaining-amount-compliant lock control (see Step S501, Step S502, Step S505, and Step S506).

Specifically, the lock control portion 8*e* maintains both of the pair of lock mechanisms 6 in the unlocked state when the toner-remaining state of the target container is not detected by the state determination portion 8*b* (see Step S501 and Step S506).

On the other hand, when the toner-remaining state of the target container is detected by the state determination portion 8*b*, the lock control portion 8*e* executes the remaining-amount-compliant lock control for the next-candidate lock mechanism (see Step S501, Step S504, and Step S505).

<Second Operation Mode: Second Remaining Amount Notification Processing>

Next, exemplary procedures of the second remaining amount notification processing will be described with reference to the flowchart shown in FIG. 10. The notification processing portion 8*f* executes the second remaining amount notification processing for each of the four attachment portion sets 5*x*.

In descriptions below, S601, S602, . . . represent identification codes of a plurality of steps in the second remaining amount notification processing. In the second remaining amount notification processing, processing of Step S601 is executed first.

<Step S601>

In Step S601, the notification processing portion 8*f* stands by until the low-toner-amount state of the target container is detected by the state determination portion 8*b*.

The notification processing portion 8*f* executes processing of Step S602 when the low-toner-amount state of the target container is detected by the state determination portion 8*b*.

<Step S602>

In Step S602, the notification processing portion 8*f* determines processing to execute next according to whether or not the target attachment portion is the designated attachment portion.

The designated attachment portion is one of the pair of attachment portions 5 that has been selected in the operation mode selection processing (see FIG. 4).

When the target attachment portion is the designated attachment portion, the notification processing portion 8*f* executes processing of Step S603. On the other hand, when the target attachment portion is not the designated attachment portion, the notification processing portion 8*f* executes the processing of Step S601.

<Step S603>

Figure 7:
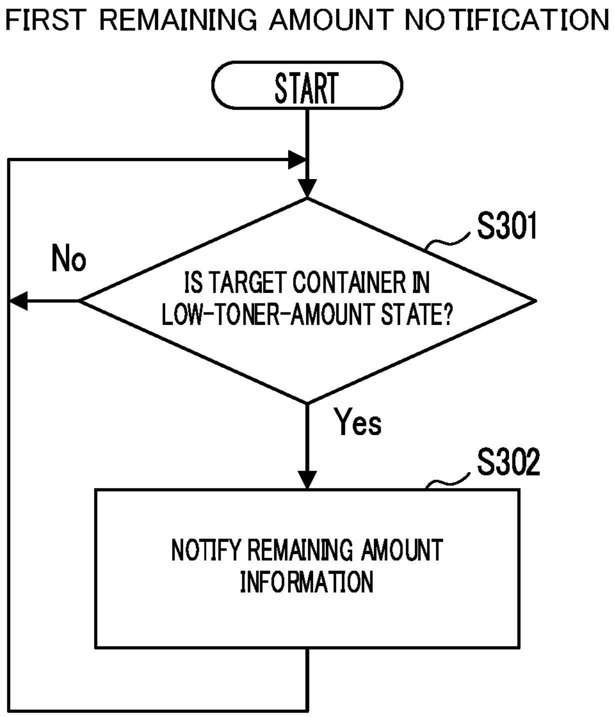
FIG. 7 is a flowchart showing exemplary procedures of first remaining amount notification processing in the image forming apparatus according to the embodiment.

In Step S603, similar to Step S302 of FIG. 7, the notification processing portion 8*f* outputs the remaining amount information representing that the low-toner-amount state has been detected to a preset notification destination. The notification destination in Step S603 is the same as the notification destination in Step S302.

After executing the processing of Step S603, the notification processing portion 8*f* executes the processing of Step S601.

As described heretofore, when the second operation mode is selected, the notification processing portion 8*f* executes the processing of Step S603 every time the low-toner-amount state of one of the pair of toner containers 7 attached to the designated attachment portion is detected by the state determination portion 8*b*.

The processing of Step S603 is an example of remaining amount state notification processing. The one of the pair of toner containers 7 attached to the designated attachment portion is an example of a specific storage unit. The processing of selecting the designated attachment portion in the operation mode selection processing is processing of selecting the specific storage unit that corresponds to the second operation mode.

By executing the second remaining amount notification processing, it becomes easy to realize an operation in which stocks of the toner containers 7 are replenished every time both of the pair of toner containers 7 become empty, for each of the four attachment portion sets 5*x*.

It is noted that the low-toner-amount state as a target of the first remaining amount notification processing and the second remaining amount notification processing is an example of a specific remaining amount state that is detected by the state determination portion 8*b*. Further, the first remaining amount notification processing and the second remaining amount notification processing may be executed while targeting the toner-empty state.

[Notification Mode Selection Processing]

In the present embodiment, the main control portion 8*a* executes the notification mode selection processing when a notification mode selection start event occurs.

For example, the notification mode selection start event is detection of a notification mode selection start operation by the operation device 801. Alternatively, the notification mode selection start event may be reception of a start command from an external terminal device by the communication device 84.

The notification mode selection processing is processing of selecting one of a first notification mode and a second notification mode according to a selection operation. The main control portion 8*a* which executes the notification mode selection processing is an example of a notification mode selection portion.

For example, the selection operation is an operation to the operation device 801. Alternatively, the selection operation may be an operation to an external terminal device communicable with the communication device 84.

Figure 11:
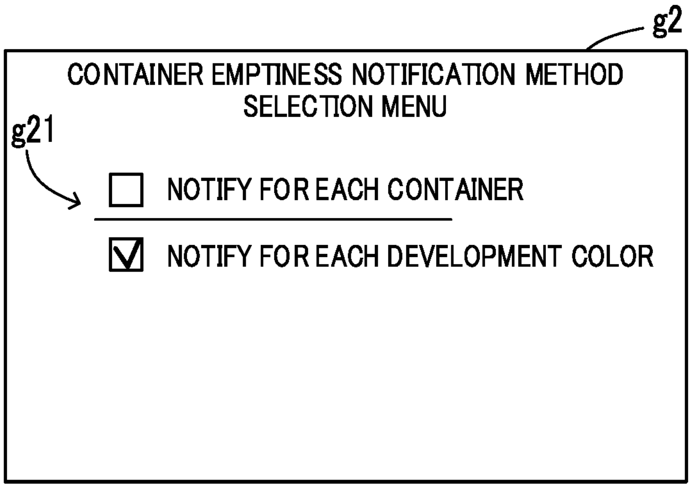
FIG. 11 is a diagram showing a first example of a container emptiness notification method selection screen in the image forming apparatus according to the embodiment.

For example, the main control portion 8*a* outputs a second menu screen g2 as shown in FIG. 11 in the notification mode selection processing. An output destination of the second menu screen g2 is the display device 802 of the image forming apparatus 10 or the external terminal device.

The second menu screen g2 includes an emptiness notification method selection menu g21 for selecting one of two candidates for the container emptiness notification method.

The main control portion 8*a* selects one of "notify for each container" and "notify for each development color" according to the selection operation on the emptiness notification method selection menu g21. The selection of "notify for each container" is a selection of the first notification mode. The selection of "notify for each development color" is a selection of the second notification mode.

It is noted that the operation mode selection processing may double as the notification mode selection processing. In this case, the selection of the first operation mode corresponds to the selection of the first notification mode, and the selection of the second operation mode corresponds to the selection of the second notification mode.

[First Notification Mode: First Emptiness Notification Processing]

When the first notification mode is selected, the notification processing portion 8*f* executes the first emptiness notification processing.

The notification processing portion 8*f* executes the first emptiness notification processing for each of the four attachment portion sets 5*x*. The first emptiness notification processing is processing for prompting a user or the like to replace the toner container 7 in the toner-empty state.

In the first emptiness notification processing, the notification processing portion 8*f* executes empty state notification processing every time the toner-empty state is detected by the state determination portion 8*b* for each of the pair of toner containers 7.

The empty state notification processing is processing of outputting information representing that the toner-empty state has been detected to a preset notification destination. The notification destination in the empty state notification processing is set in advance.

The notification destination in the empty state notification processing includes the display device 802 of the image forming apparatus 10. In addition, the notification destination may include an information terminal of a user who is in charge of replacing the toner containers 7. The information terminal is a part of the plurality of external devices communicable with the communication device 84.

By executing the first emptiness notification processing, it becomes easy to realize an operation of replacing the toner container 7 every time one toner container 7 becomes empty.

[Second Notification Mode: Second Emptiness Notification Processing]

When the second notification mode is selected, the notification processing portion 8*f* executes the second emptiness notification processing.

The notification processing portion 8*f* executes the second emptiness notification processing for each of the four attachment portion sets 5*x*. The second emptiness notification processing corresponds to the first emptiness notification processing in the first notification mode.

In the second emptiness notification processing, the notification processing portion 8*f* executes the empty state notification processing when the toner-empty state of both of the pair of toner containers 7 is detected by the state determination portion 8*b*.

In other words, in the second emptiness notification processing, the empty state notification processing is executed when the toner-empty state of both of the pair of toner containers 7 is detected for each of the four attachment portion sets 5*x*.

By executing the second emptiness notification processing, it becomes easy to realize an operation in which the pair of toner containers 7 are replaced at the same time every time both of the pair of toner containers 7 become empty.

[Forced Unlock Processing]

In the present embodiment, when a forced unlock operation is detected by the operation device 801, the supply control portion 8*d* and the lock control portion 8*e* execute forced unlock processing.

The forced unlock processing is exceptional processing regarding the control of each of the lock mechanisms 6 and the selection of the target attachment portion. For example, the forced unlock operation is performed at a time of an emergency, such as in a case where some kind of a trouble occurs.

The forced unlock operation includes an operation of selecting a designated lock mechanism out of the eight lock mechanisms 6. The designated lock mechanism is selected from the lock mechanisms 6 in the locked state.

The forced unlock operation may include an authentication information input operation. In this case, the main control portion 8*a* executes authentication processing of collating the input authentication information with pre-registered registration information to thus determine success and failure of the authentication.

When the authentication processing is executed, the main control portion 8*a* determines that the forced unlock operation is effective only when succeeding in the authentication processing. In this case, the supply control portion 8*d* and the lock control portion 8*e* execute the forced unlock processing when the effective forced unlock operation is detected.

Figure 12:
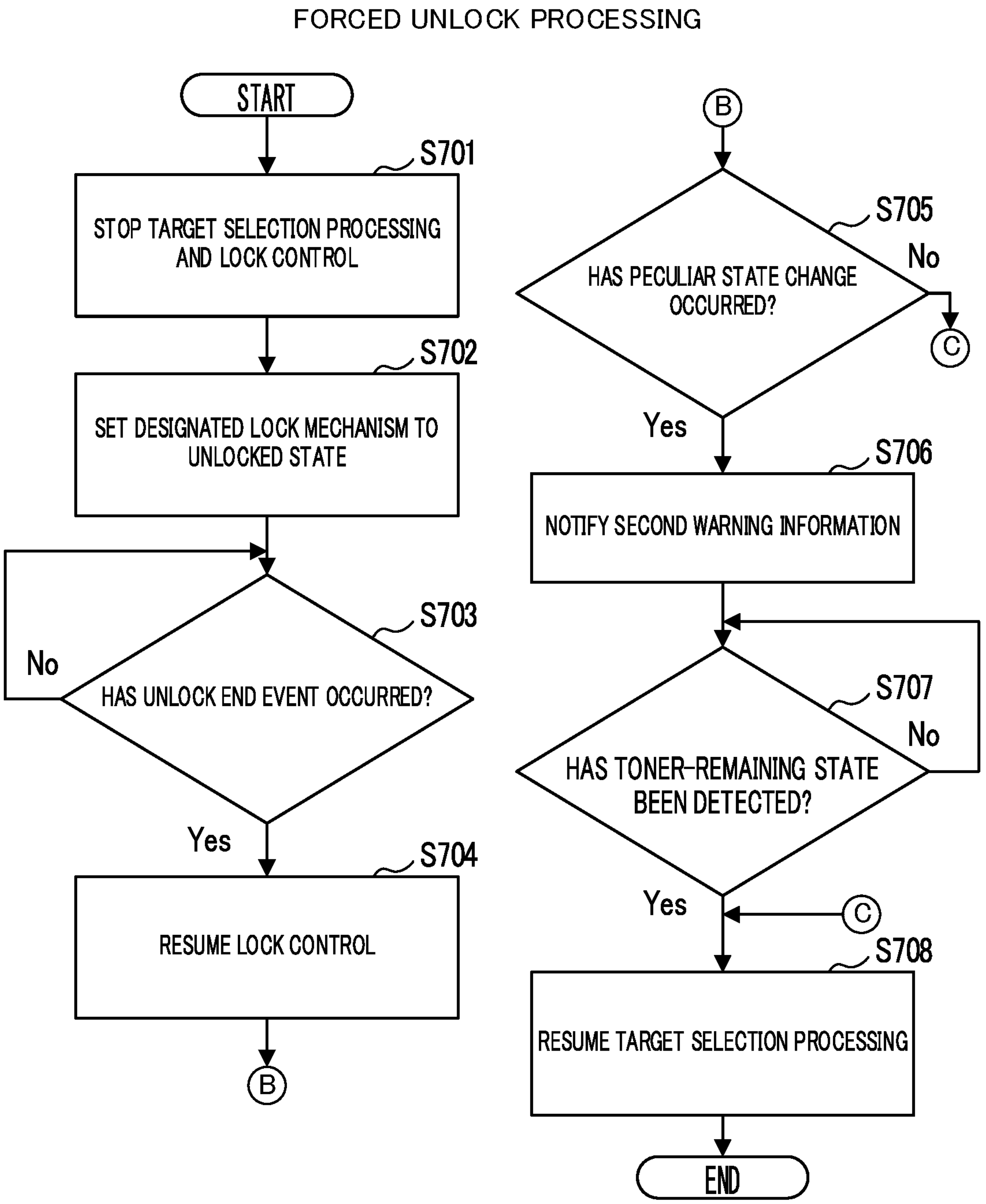
FIG. 12 is a flowchart showing exemplary procedures of forced unlock processing in the image forming apparatus according to the embodiment.

Hereinafter, exemplary procedures of the forced unlock processing will be described with reference to the flowchart shown in FIG. 12. The supply control portion 8*d* and the lock control portion 8*e* execute the forced unlock processing for one of the four attachment portion sets 5*x* that corresponds to the designated lock mechanism.

In descriptions below, S701, S702, . . . represent identification codes of a plurality of steps in the forced unlock processing. In the forced unlock processing, processing of Step S701 is executed first.

<Step S701>

In Step S701, the supply control portion 8*d* stops the target selection processing, and the lock control portion 8*e* stops the lock control.

The target selection processing is the first target selection processing or the second target selection processing. The lock control is the first lock control or the second lock control.

After executing the processing of Step S701, the lock control portion 8*e* executes processing of Step S702.

<Step S702>

In Step S702, the lock control portion 8*e* sets the designated lock mechanism to the unlocked state. After that, the lock control portion 8*e* executes processing of Step S703.

<Step S703>

In Step S703, the lock control portion 8*e* stands by until a predetermined unlock end event occurs.

For example, the unlock end event includes a first end event indicating that a forced unlock end operation with respect to the operation device 801 has been detected.

Further, the unlock end event may include a second end event indicating that a change of the container cover 6*a* corresponding to the designated lock mechanism from the cover-opened state to the cover-closed state has been detected. The state of the container cover 6*a* is detected by the cover sensor 6*b* (see FIG. 3).

For example, the lock control portion 8*e* recognizes each of the first end event and the second end event as the unlock end event.

When the unlock end event occurs, the lock control portion 8*e* executes processing of Step S704.

<Step S704>

In Step S704, the lock control portion 8*e* resumes the lock control. Subsequently, the supply control portion 8*d* executes processing of Step S705. Thus, the processing related to the lock control portion 8*e* in the forced unlock processing ends.

<Step S705>

In Step S705, the supply control portion 8*d* determines processing to execute next according to whether or not a predetermined peculiar state change has occurred.

The peculiar state change is a state where, under the situation where the second operation mode is selected, the target lock mechanism is designated as the designated lock mechanism and a specific change has occurred in the detection of the remaining toner amount before or after the detection of the forced unlock operation.

The specific change means a change in the detection state of the remaining toner amount obtained by the state determination portion 8*b* from the toner-remaining state to the toner-empty state regarding the target container.

The designation of the target lock mechanism as the designated lock mechanism means that the forced unlock operation detected before Step S701 is an unlock operation for the target lock mechanism in the locked state.

In descriptions below, the forced unlock operation performed when the target lock mechanism is the designated lock mechanism will be referred to as a target forced unlock operation.

The supply control portion 8*d* executes processing of Step S708 when the peculiar state change has not occurred. On the other hand, the supply control portion 8*d* executes processing of Step S706 when the peculiar state change has occurred.

<Step S706>

In Step S706, the supply control portion 8*d* outputs second warning information to a preset notification destination. The processing of Step S706 is an example of warning output processing.

For example, the second warning information is information that prompts the toner container 7 removed from the target attachment portion to be returned to the target attachment portion.

The notification destination in Step S706 may include the display device 802 of the image forming apparatus 10.

Further, the notification destination in Step S706 may include an information terminal of a user who is in charge of replacing the toner containers 7. The information terminal is a part of the plurality of external devices communicable with the communication device 84.

After executing the processing of Step S706, the supply control portion 8*d* executes the processing of Step S707. It is noted that the supply control portion 8*d* which executes the processing of Step S706 is an example of warning processing portion.

<Step S707>

In Step S707, the supply control portion 8*d* stands by until the toner-remaining state of the target container is detected by the state determination portion 8*b*.

The supply control portion 8*d* executes the processing of Step S708 when the toner-remaining state of the target container is detected.

<Step S708>

In Step S708, the supply control portion 8*d* resumes the target selection processing. Thus, the processing related to the supply control portion 8*d* in the forced unlock processing also ends.

Hereinafter, a period from when the target forced unlock operation is detected to when the unlock end event occurs will be referred to as a forced unlock period.

When the target forced unlock operation is detected under the situation where the second operation mode is selected, the lock control portion 8*e* maintains the unlocked state of the target lock mechanism during the forced unlock period (see Step S701 to Step S704).

In other words, the lock control portion 8*e* does not execute the remaining-amount-compliant lock control for the target lock mechanism during the forced unlock period.

In addition, when the peculiar state change occurs, the supply control portion 8*d* maintains the selection state of the target attachment portion without executing the target selection processing until the toner-remaining state of the target container is detected (see Step S701 and Step S705 to Step S708).

Furthermore, the supply control portion 8*d* executes the warning output processing of Step S706 when the peculiar state change occurs.

By executing the forced unlock processing, exceptional measures can be taken for the toner supplying portion 50 at the time of an emergency.

Further, the processing of Step S701 and Step S705 to Step S708 is processing corresponding to a case where an inappropriate operation with respect to the target attachment portion is made under the situation where the second operation mode is selected.

The operation of removing the target container in the toner-remaining state from the target attachment portion is an example of the inappropriate operation. Moreover, the operation of attaching the toner container 7 in the toner-empty state to the target attachment portion is also an example of the inappropriate operation.

By executing the processing of Step S701 and Step S705 to Step S708, an unexpected target attachment portion is prevented from being newly selected according to the inappropriate operation.

Further, the warning output processing of Step S706 prompts the user or the administrator to change the inappropriate operation.

First Application Example

Next, a first application example of the image forming apparatus 10 will be described with reference to FIG. 13. Hereinafter, points of the first application example that are different from those of the processing of the image forming apparatus 10 will be described.

Figure 13:
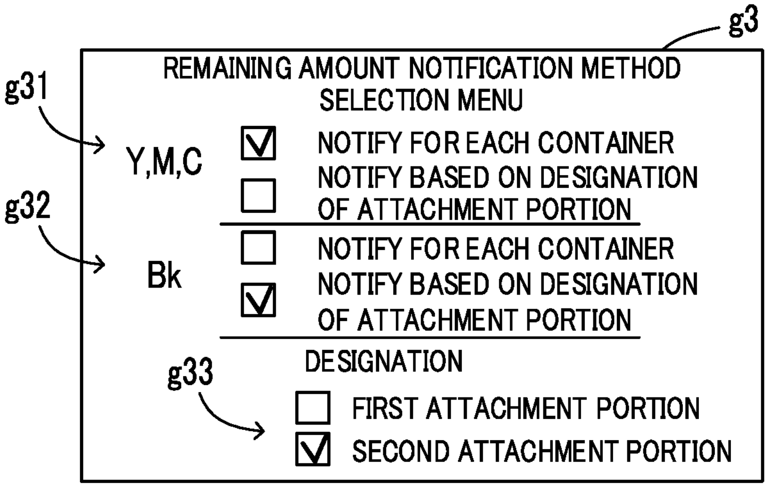
FIG. 13 is a diagram showing a second example of the remaining amount notification method selection screen in the image forming apparatus according to the embodiment.

In the present application example, the main control portion 8*a* outputs a third menu screen g3 as shown in FIG. 13 when executing the operation mode selection processing. The main control portion 8*a* outputs the third menu screen g3 in place of the first menu screen g1 shown in FIG. 4.

The third menu screen g3 includes a remaining amount notification method selection menu g31 for selecting one of the two candidates for the remaining amount notification method regarding the three chromatic attachment portion sets 52.

According to the selection operation on the remaining amount notification method selection menu g31, the main control portion 8*a* selects one of the first operation mode and the second operation mode for the three chromatic attachment portion sets 52. This selection processing is similar to the selection processing that is based on the remaining amount notification method selection menu g11 shown in FIG. 4.

In addition, the third menu screen g3 includes a remaining amount notification method selection menu g32 for selecting one of the two candidates for the remaining amount notification method regarding the one black-color attachment portion set 51.

According to the selection operation on the remaining amount notification method selection menu g32, the main control portion 8*a* selects one of the first operation mode and the second operation mode for the one black-color attachment portion set 51. This selection processing is also similar to the selection processing that is based on the remaining amount notification method selection menu g11 shown in FIG. 4.

In the present application example, the main control portion 8*a* is capable of selecting one of the first operation mode and the second operation mode independently for the one black-color attachment portion set 51 and the three chromatic attachment portion sets 52.

The third menu screen g3 further includes a designated attachment portion selection menu g33. According to the selection operation on the designated attachment portion selection menu g33, the main control portion 8*a* selects one of the pair of attachment portions 5 in each of the four attachment portion sets 5*x* as the designated attachment portion.

In the present application example, the supply control portion 8*d* executes the first target selection processing or the second target selection processing corresponding to the mode selected by the main control portion 8*a* for the one black-color attachment portion set 51 and each of the three chromatic attachment portion sets 52.

In the present application example, the lock control portion 8*e* executes the first automatic lock control or the second automatic lock control corresponding to the mode selected by the main control portion 8*a* for the one black-color attachment portion set 51 and each of the three chromatic attachment portion sets 52.

In the present application example, the notification processing portion 8*f* executes the first remaining amount notification processing or the second remaining amount notification processing corresponding to the mode selected by the main control portion 8*a* for the one black-color attachment portion set 51 and each of the three chromatic attachment portion sets 52.

By adopting the present application example, it becomes possible to deal with more diverse operations.

It is noted that the main control portion 8*a* may be capable of selecting one of the first operation mode and the second operation mode independently for each of the four attachment portion sets 5*x*. In this case, the supply control portion 8*d*, the lock control portion 8*e*, and the notification processing portion 8*f* execute the processing corresponding to the operation mode selected for each of the four attachment portion sets 5*x*.

Second Application Example

Next, a second application example of the image forming apparatus 10 will be described with reference to FIG. 14. Hereinafter, points of the second application example that are different from those of the processing of the image forming apparatus 10 will be described.

Figure 14:
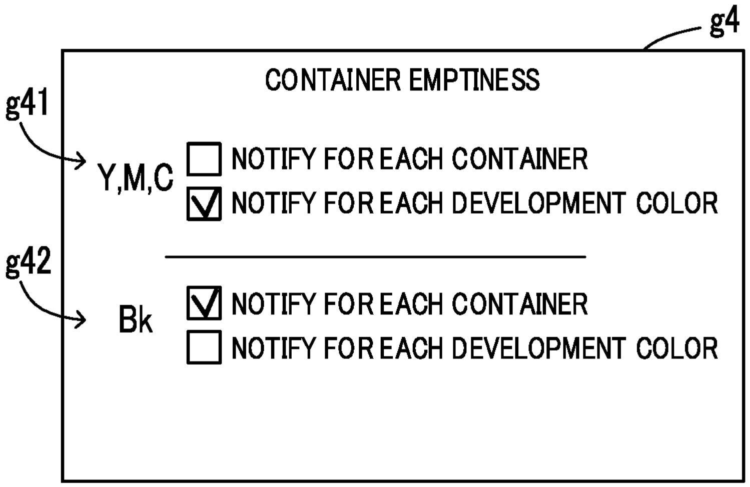
FIG. 14 is a diagram showing a second example of the container emptiness notification method selection screen in the image forming apparatus according to the embodiment.

In the present application example, the main control portion 8*a* outputs a fourth menu screen g4 as shown in FIG. 14 when executing the notification mode selection processing. The main control portion 8*a* outputs the fourth menu screen g4 in place of the second menu screen g2 shown in FIG. 11.

The fourth menu screen g4 includes an emptiness notification method selection menu g41 for selecting one of the two candidates for the container emptiness notification method regarding the three chromatic attachment portion sets 52.

According to the selection operation on the emptiness notification method selection menu g41, the main control portion 8*a* selects one of the first notification mode and the second notification mode for the three chromatic attachment portion sets 52. This selection processing is similar to the selection processing that is based on the emptiness notification method selection menu g21 shown in FIG. 11.

In addition, the fourth menu screen g4 includes an emptiness notification method selection menu g42 for selecting one of the two candidates for the container emptiness notification method regarding the one black-color attachment portion set 51.

According to the selection operation on the emptiness notification method selection menu g42, the main control portion 8*a* selects one of the first notification mode and the second notification mode for the one black-color attachment portion set 51. This selection processing is also similar to the selection processing that is based on the emptiness notification method selection menu g21 shown in FIG. 11.

In the present application example, the main control portion 8*a* is capable of selecting one of the first notification mode and the second notification mode independently for the one black-color attachment portion set 51 and the three chromatic attachment portion sets 52.

In the present application example, the supply control portion 8*d* executes the first target selection processing or the second target selection processing corresponding to the mode selected by the main control portion 8*a* for the one black-color attachment portion set 51 and each of the three chromatic attachment portion sets 52.

In the present application example, the notification processing portion 8*f* executes the first emptiness notification processing or the second emptiness notification processing corresponding to the mode selected by the main control portion 8*a* for the one black-color attachment portion set 51 and each of the three chromatic attachment portion sets 52.

By adopting the present application example, it becomes possible to deal with more diverse operations.

It is noted that the main control portion 8*a* may be capable of selecting one of the first notification mode and the second notification mode independently for each of the four attachment portion sets 5*x*. In this case, the notification processing portion 8*f* executes the processing corresponding to the notification mode selected for each of the four attachment portion sets 5*x*.

Third Application Example

Next, a third application example of the image forming apparatus 10 will be described.

In the present application example, the processing of the supply control portion 8*d*, the lock control portion 8*e*, and the notification processing portion 8*f* is applied to a monochromatic image forming apparatus.

The monochromatic image forming apparatus includes one attachment portion set 5*x* corresponding to one development color.

In the present application example, the main control portion 8*a* is capable of selecting one of the first operation mode and the second operation mode for the one attachment portion set 5*x*. Similarly, the main control portion 8*a* is capable of selecting one of the first notification mode and the second notification mode for the one attachment portion set 5*x*.

In the present application example, the supply control portion 8*d*, the lock control portion 8*e*, and the notification processing portion 8*f* execute the processing corresponding to the operation mode selected for the one attachment portion set 5*x*. Similarly, the notification processing portion 8*f* executes the processing corresponding to the notification mode selected for the one attachment portion set 5*x*.

Fourth Application Example

Next, a fourth application example of the image forming apparatus 10 will be described.

In the present application example, the processing of the supply control portion 8*d*, the lock control portion 8*e*, and the notification processing portion 8*f* is applied to an inkjet image forming apparatus. In other words, in the present application example, the printing device 4 executes the print processing using an inkjet system.

In the image forming apparatus in the present application example, eight ink tanks that each store ink can be attached in place of the eight toner containers 7. The ink is an example of the developer. The eight ink tanks are an example of a plurality of developer storage units.

The image forming apparatus in the present application example includes four attachment portion sets 5*x* to which the eight ink tanks are to be attached.

Also when the present application example is adopted, effects similar to those of the case where the image forming apparatus 10 is adopted can be obtained.

It is noted that the processing of the supply control portion 8*d*, the lock control portion 8*e*, and the notification processing portion 8*f* may also be applied to an inkjet monochromatic image forming apparatus.

Fifth Application Example

Next, a fifth application example of the image forming apparatus 10 will be described.

In the image forming apparatus in the present application example, each of the attachment portion sets 5*x* includes three or more attachment portions 5. In the present application example, the supply control portion 8*d* selects, for each of the attachment portion sets 5*x*, the target attachment portion from the three or more attachment portions 5.

Further, in the present application example, a designation number N of 2 or more is set for each attachment portion set 5*x*. When the second notification mode is selected, the notification processing portion 8*f* executes, for each attachment portion set 5*x*, the empty state notification processing every time the toner-empty state is detected for the N toner containers 7.

Also when the present application example is adopted, effects similar to those of the case where the image forming apparatus 10 is adopted can be obtained.

NOTES OF DISCLOSURE

Hereinafter, a general outline of the disclosure extracted from the embodiment described above will be noted. It is noted that the respective configurations and processing functions described in the notes below can be sorted and combined arbitrarily.

<Note 1>

An image forming apparatus, including:

a printing portion which forms an image on a sheet;

a plurality of attachment portions to each of which a plurality of developer storage units can be attached, the plurality of developer storage units storing developer of a same color that is to be supplied to the printing portion;

a remaining amount detection portion which detects a remaining amount of the developer in each of the plurality of developer storage units attached to the plurality of attachment portions;

a target selection portion which selects one target attachment portion out of the plurality of attachment portions, and selects, when a detection state of the remaining amount detection portion regarding a target storage unit attached to the target attachment portion out of the plurality of developer storage units changes from a developer-remaining state to a developer-empty state, a new target attachment portion as the target attachment portion;

a supplying mechanism which supplies the developer from the target storage unit to the printing portion;

a notification mode selection portion which selects one of a first notification mode and a second notification mode according to a selection operation; and a notification processing portion which executes, when the first notification mode is selected, empty state notification processing for outputting information representing the developer-empty state to a preset notification destination every time the developer-empty state is detected by the remaining amount detection portion for each of the plurality of developer storage units, and executes, when the second notification mode is selected, the empty state notification processing when the developer-empty state of some of the plurality of developer storage units is detected by the remaining amount detection portion.

<Note 2>

The image forming apparatus according to Note 1, further including:

a display device capable of displaying information, in which the notification destination includes the display device.

<Note 3>

The image forming apparatus according to Note 1 or 2, further including:

a communication device capable of communicating with a plurality of external devices, in which the notification destination includes some of the plurality of external devices.

<Note 4>

The image forming apparatus according to any one of Notes 1 to 3, including:

a plurality of attachment portion sets which respectively correspond to different development colors and each include the plurality of attachment portions, in which the target selection portion selects the target attachment portion for each of the plurality of attachment portion sets, and the notification processing portion executes the empty state notification processing corresponding to the mode selected by the notification mode selection portion for each of the plurality of attachment portion sets.

<Note 5>

The image forming apparatus according to any one of Notes 1 to 3, including:

one black-color attachment portion set which corresponds to the developer of black and includes the plurality of attachment portions; and a plurality of chromatic attachment portion sets which respectively correspond to the developer of a plurality of chromatic colors and each include the plurality of attachment portions, in which the notification mode selection portion is capable of selecting one of the first notification mode and the second notification mode independently for the one black-color attachment portion set and the plurality of chromatic attachment portion sets, the target selection portion selects the target attachment portion for the one black-color attachment portion set and each of the plurality of chromatic attachment portion sets, and the notification processing portion executes the empty state notification processing corresponding to the mode selected by the notification mode selection portion for the one black-color attachment portion set and each of the plurality of chromatic attachment portion sets.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a printing portion which forms an image on a sheet;

a plurality of attachment portions to each of which a plurality of developer storage units can be attached, the plurality of developer storage units storing developer of a same color that is to be supplied to the printing portion;

a remaining amount detection portion which detects a remaining amount of the developer in each of the plurality of developer storage units attached to the plurality of attachment portions;

a target selection portion which selects one target attachment portion out of the plurality of attachment portions, and selects, when a detection state of the remaining amount detection portion regarding a target storage unit attached to the target attachment portion out of the plurality of developer storage units changes from a developer-remaining state to a developer-empty state, a new target attachment portion as the target attachment portion;

a supplying mechanism which supplies the developer from the target storage unit to the printing portion;

a notification mode selection portion which selects one of a first notification mode and a second notification mode according to a selection operation; and a notification processing portion which executes, when the first notification mode is selected, empty state notification processing for outputting information representing the developer-empty state to a preset notification destination every time the developer-empty state is detected by the remaining amount detection portion for each of the plurality of developer storage units, and executes, when the second notification mode is selected, the empty state notification processing when the developer-empty state of some of the plurality of developer storage units is detected by the remaining amount detection portion.

2. The image forming apparatus according to claim 1, further comprising:

a display device capable of displaying information, wherein the notification destination includes the display device.

3. The image forming apparatus according to claim 1, further comprising:

a communication device capable of communicating with a plurality of external devices, wherein the notification destination includes some of the plurality of external devices.

4. The image forming apparatus according to claim 1, comprising:

a plurality of attachment portion sets which respectively correspond to different development colors and each include the plurality of attachment portions, wherein the target selection portion selects the target attachment portion for each of the plurality of attachment portion sets, and the notification processing portion executes the empty state notification processing corresponding to the mode selected by the notification mode selection portion for each of the plurality of attachment portion sets.

5. The image forming apparatus according to claim 1, comprising:

one black-color attachment portion set which corresponds to the developer of black and includes the plurality of attachment portions; and a plurality of chromatic attachment portion sets which respectively correspond to the developer of a plurality of chromatic colors and each include the plurality of attachment portions, wherein the notification mode selection portion is capable of selecting one of the first notification mode and the second notification mode independently for the one black-color attachment portion set and the plurality of chromatic attachment portion sets, the target selection portion selects the target attachment portion for the one black-color attachment portion set and each of the plurality of chromatic attachment portion sets, and the notification processing portion executes the empty state notification processing corresponding to the mode selected by the notification mode selection portion for the one black-color attachment portion set and each of the plurality of chromatic attachment portion sets.

* * * * *